United States Patent [19]

Witting

[11] 4,173,728

[45] Nov. 6, 1979

[54] PULSED CESIUM DISCHARGE LIGHT SOURCE

[75] Inventor: Harald L. Witting, Burnt Hills, N.Y.

[73] Assignee: General Electric Company, Schenectady, N.Y.

[21] Appl. No.: 907,792

[22] Filed: May 19, 1978

Related U.S. Application Data

[63] Continuation-in-part of Ser. No. 730,129, Oct. 6, 1976, abandoned.

[51] Int. Cl.$^2$ .............................................. H01J 13/00
[52] U.S. Cl. ..................................... 313/163; 313/227; 313/232; 313/171
[58] Field of Search ............... 313/163, 171, 223, 227, 313/232, 29, 34

[56] References Cited

U.S. PATENT DOCUMENTS

| 2,116,689 | 5/1938 | Rompe | 313/227 |
| 3,317,776 | 5/1967 | Brittain | 313/232 |

Primary Examiner—Eugene R. La Roche
Assistant Examiner—Robert E. Wise
Attorney, Agent, or Firm—Lawrence D. Cutter; Joseph T. Cohen; Marvin Snyder

[57] ABSTRACT

A metal vapor discharge lamp includes a cathode comprising a reservoir of liquid cesium. Metallic cesium which is eroded from the cathode surface by the action of the discharge is returned to the reservoir by the combined effects of gravity, evaporation, condensation, and diffusion to provide a highly stable, long-lived lamp.

The intense infrared pulse output of cesium vapor discharge lamps of the present invention is well suited for triggering light-activated semiconductor switches through dielectric pipe networks and for pumping neodymium glass or neodymium-YAG lasers.

25 Claims, 9 Drawing Figures

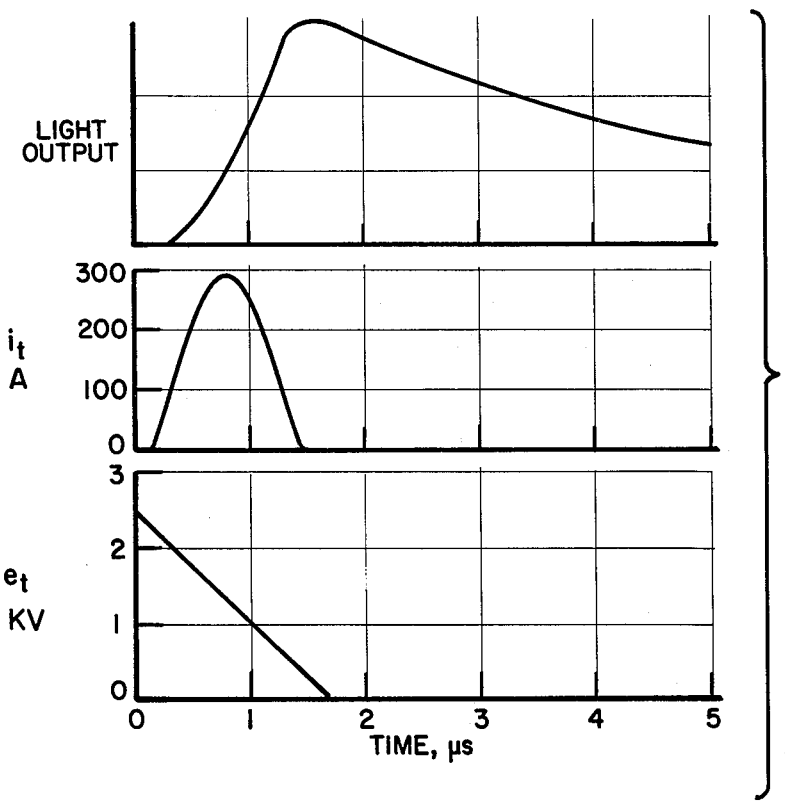

PULSED CESIUM DISCHARGE LIGHT SOURCE

This application is a continuation-in-part of application Ser. No. 730,129, filed Oct. 6, 1976, abandoned.

This invention relates to pulsed light sources. More specifically, this invention relates to pulsed cesium vapor discharge lamps wherein cesium is returned to a cathode in a regenerative cycle and to systems for utilizing such lamps.

BACKGROUND OF THE INVENTION

Solid state, high voltage power converters will be used to convert direct current to alternating current and alternating current to direct current in electrical transmission systems. Those converters will comprise networks of thousands of solid state switching elements, many of which will be connected with all of their terminals at high potentials above ground level. The switching action of those elements must be carefully timed and coordinated to assure that the power converter operates in an efficient and nondestructive manner. The projected cost of insulated pulse transformers, which would be required to trigger solid state switches in a conventional manner, is so large as to make the over-all cost of such an installation prohibitive. It has been proposed, therefore, to employ silicon thyristors which are triggered by radiation, i.e., infrared light, pulses. Radiation may be transmitted from a few sources to large numbers of thyristors in a single installation, via dielectric light pipes which provide electrical isolation.

Light-activated thyristors are, of course, well known to the semiconductor art and are described, for example, in U.S. Pat. No. 3,893,153 to Page et al. for *Light Activated Thyristor with High Di/Dt Capability*.

A source which is used to trigger light-activated thyristors in power conversion applications should, optimally, supply pulses of infrared radiation between approximately 9000 Å and approximately 11,000 Å which last for a few microseconds. It is further required that the light source operate at pulse repetition rates of at least 60 pulses per second (pps) and, for economic operation, have a lifetime on the order of 1 year or more: that is, the light source should have a lifetime of at least $2 \times 10^9$ pulses.

Thyristors have been triggered by means of light-emitting diodes placed in close proximity to the semiconductor chip. However, it is not clear that light-emitting diodes can deliver the high output power levels which are required to compensate for light pipe losses and yet survive for $2 \times 10^9$ pulses.

Pulsed infrared light output at levels which are sufficient for thyristor triggering may also be obtained from xenon flash lamps, with solid metal electrodes, of the type which are well known to the prior art. However, the lifetime of prior art flash lamps is limited, mainly by the effects of cathode erosion, to approximately $10^6$ flashes or less.

The lifetime of prior art rare gas lamps which are commonly utilized in other pulsed service applications is similarly limited. Neodymium-YAG and neodymium glass lasers are typically pumped by flash lamps containing xenon or krypton. These flash lamps are also severely limited in lifetime. At flash energies near the explosion limit lamp lifetime is controlled by envelope failure. At lower flash energies, lamp lifetime is limited by cathode erosion which causes envelope darkening and thus reduces light output.

SUMMARY OF THE INVENTION

A pulsed infrared light source comprises a cesium discharge tube including a liquid cesium reservoir. Current may flow directly from the surface of a pool of liquid cesium or may, alternately, flow from a short solid metal cathode which extends through the surface of a cesium reservoir.

The liquid cesium cathode reservoir is designed to operate as the coolest internal surface of the lamp. Cesium which is eroded from the cathode, as a vapor and/or by liquid splatter, is, therefore, returned to the reservoir by gravity (when operated vertically) and by evaporation, diffusion, and condensation. Since cesium ions inherently migrate to the cathode end of the tube, subsequent electrical recombination also operates to return cesium to the reservoir. A cycle is thus provided for regenerating the cathode by returning cesium from other portions of the lamp structure so that lamp life is substantially extended over that of prior art discharge lamps.

Cesium vapor pressure within the lamp may be adjusted by varying the lamp operating temperature, for example, by varying the size and position of heat shields in the vicinity of the anode and cathode. The wavelength of the light produced by the lamp may, thereby, be varied to match the output energy to the wavelength requirements of light activated thyristors or to neodymium lasers.

It is, therefore, an object of the invention to provide an efficient source of pulsed radiation in the form of a cesium discharge.

Another object of the invention is to provide a regenerative cesium cathode for a discharge tube.

Another object of the invention is to provide efficient, long-lived sources of radiation for triggering light-activated thyristors.

Another object of the invention is to provide long-lived radiation sources for pumping neodymium doped lasers.

BRIEF DESCRIPTION OF THE DRAWINGS

The novel features believed characteristic of the present invention are set forth in the appended claims. The invention itself, together with further objects and advantages thereof, may best be understood by reference to the following detailed description, taken in connection with the appended drawings in which:

FIGS. 5A–5C graphically illustrate the operating characteristics of lamps in the circuit of FIG. 4;

FIG. 6 is a system wherein a cesium discharge lamp is utilized to optically trigger a plurality of light-activated thyristors; and FIG. 7 schematically illustrates a plurality of cesium discharge lamps which are coupled to pump a neodymium-glass laser.

DESCRIPTION OF THE PREFERRED EMBODIMENTS

Figure 1:
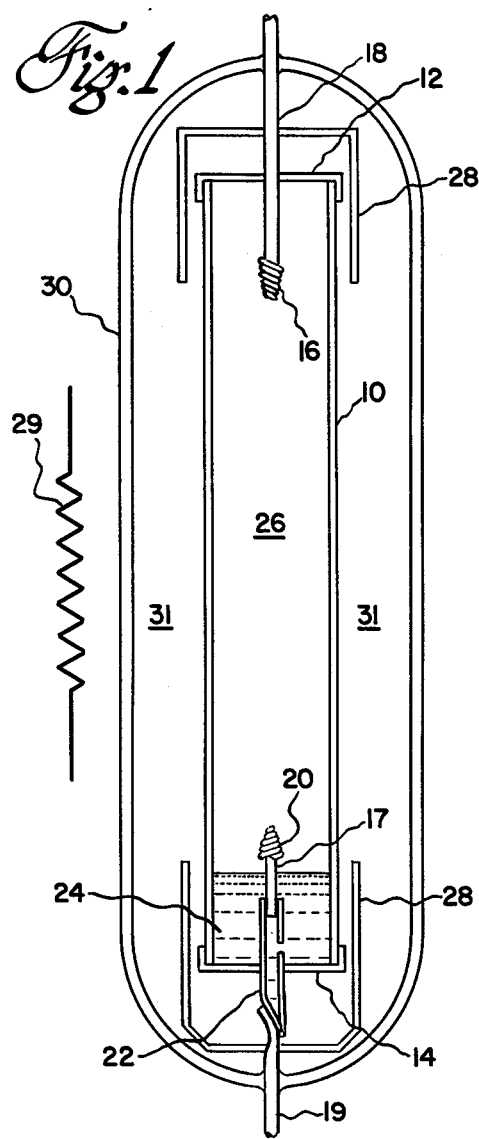
FIG. 1 is a cesium discharge lamp of the present invention.

FIG. 1 is a cesium discharge lamp of the present invention. An arc tube 10 which may, for example, comprise transparent alumina, is sealed at its top and bottom ends with caps 12 and 14. A solid metal anode 16 is disposed in the top of the tube 10 and is connected and supported by a lead wire 18 which sealably penetrates the top end cap 12. A solid metal cathode 20 is disposed in the bottom of the arc tube 10 and is supported by a stem 17 which is affixed to a metal pump-out tube 22 which sealably penetrates the bottom end cap 14 and is connected to and supported by a lead wire 19. A pool of liquid cesium 24 fills the bottom of the arc tube and extends to within approximately 0.5 cm of the uppermost extension of the cathode 20. The remainder of the arc tube is filled with a discharge gas 26 which comprises, as a major portion, cesium vapor. Heat shields 28 may, if desired, be affixed to the support leads 18 and 19 and extend around the ends of the arc tube 10. The position of the heat shields 28, with respect to the anode 16 and cathode 20 serves, to a large extent, to fix the temperature of the cesium pool 24 and thus determines the vapor pressure of cesium in the fill gas 26. The arc tube 10 is enclosed in an outer envelope 30 which may, for example, comprise hard glass and which is sealed to the anode lead 18 and the cathode lead 19. The space between the outer envelope 30 and the arc tube 10 is optimally either evacuated or filled with an inert gas to provide thermal insulation and to prevent oxidation of the outer surface of the arc tube.

The end caps 12 and 14 as well as the pump-out tube 22, the anode lead 18, the cathode stem 17, the anode 16 and the cathode 20 must comprise materials which are chemically compatible with cesium vapor at high temperature. The end caps 12 and 14 should, also, have thermal characteristics which are matched to those of the alumina arc tube 10. Ideally, the end caps 12 and 14 are formed from niobium, while the cathode 20 and the anode 16 comprise tungsten, platinum, iridium, or osmium. In a typical lamp of the present invention, the arc tube 10 is approximately seven millimeters in diameter and ten centimeters long; the anode-to-cathode spacing is approximately seven centimeters.

The arc tube is connected to a power supply circuit (more particularly described below) which functions to deliver a dc "keep-alive" current of approximately 1 ampere between the cathode and anode on which are superimposed periodic current pulses in the range from approximately 100 amperes to approximately 1000 amperes and of approximately 1 microsecond duration.

In operation, a stable arc forms near the tip of the cathode 20 and extends to the anode 16. Cesium is adsorbed on the cathode 20 from the vapor phase and is eroded from the cathode by the arc action. Cesium is strongly adsorbed on such metals as tungsten, platinum, iridium, and osmium and operates to keep them covered with a protective cesium layer. Additionally, when so coated, these materials exhibit improved electron emission properties making them particularly effective as cathodes. Moreover, the protruding cathode operates to produce a stable cathode spot at a proper temperature.

Eroded cesium is returned to the reservoir 24 by evaporation, diffusion, and condensation since the reservoir of cesium 24 normally operates as the coolest internal surface of the lamp. It is important to avoid short-circuiting the arc tube 10 with a liquid cesium layer on its inner insulating surface. This can be accomplished by maintaining the surface of the arc tube 10 at a temperature well above the temperature of the reservoir 24 to assure that any cesium layer on the surface is sufficiently thin to prevent short-circuiting of the tube.

The arc tube 10 is maintained at this high temperature by the heat from the discharge current which may, if desired, be augmented by external heaters 29, and by the thermal effect of the insulating medium in the space 31.

The vapor pressure of cesium within the tube may be determined from the equation:

$$\log_{10} P = -(3870/T) + 8.39 - \log_{10}\sqrt{T}$$

where P is the vapor pressure in torr and T is the cold spot temperature in °K.: that is, the temperature of the cesium reservoir. Cesium discharge lamps of the present invention may be operated with the cesium vapor pressure in the range of from approximately 5 torr to approximately 100 torr. Optimum infrared light output is obtained at a cesium pressure of approximately 40 torr, which corresponds to a cesium pool temperature of approximately 450° C. In practice, the cesium vapor pressure is typically calculated from measurements of the pool temperature which are made using an infrared pyrometer.

Discharge lamps which contain substantially pure cesium vapor must be raised to a temperature in the vicinity of the operating temperature before an arc can be established. This may be accomplished by preheating the lamp structure with external heaters 29 which may, in a lamp of proper thermal design, be removed after an arc is established. Alternately, a small quantity of an inert gas, for example xenon at approximately 10 torr, may be added to the cesium fill to permit room temperature starting. In that case an arc which initially starts in the xenon acts to raise the lamp temperature and to effect the cesium discharge.

Figure 2:
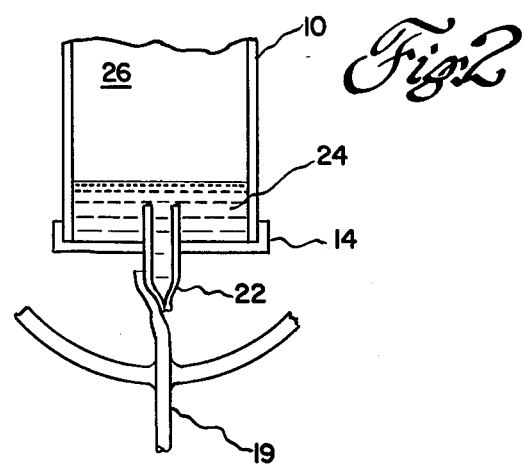
FIG. 2 is an alternate cathode for the lamp of FIG. 1.

In the lamp embodiment of FIG. 1, cesium is adsorbed from the vapor phase onto the solid metallic cathode 20 to replenish the metal which is eroded by the lamp arc. The solid cathode 20 may, however, be omitted from the lamp. FIG. 2 is an embodiment of the cathode region of a lamp, similar to that illustrated in FIG. 1, wherein an arc discharge terminates directly on the surface of a cesium pool 24, the cathode 20, and cathode stem 17 (of FIG. 1) being absent from the structure. Cesium vapor is discharged from the surface of the pool 24 in a vapor jet and is returned to the pool in a manner similar to that described with respect to the operation of the lamp of FIG. 1.

Figure 3:
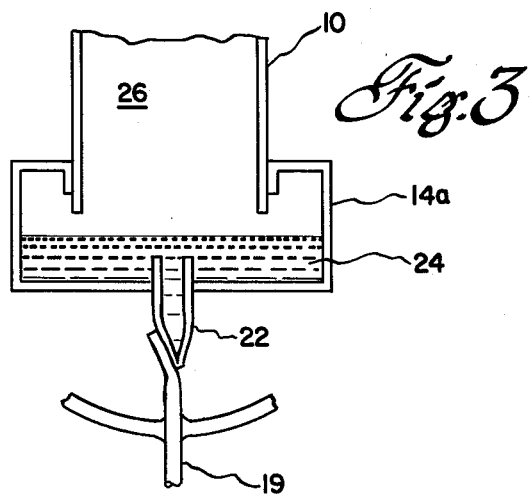
FIG. 3 is an alternate cathode for the lamp of FIG. 1.

Although the structure of the lamp cathode embodiment of FIG. 2 is somewhat simpler, mechanically, than the embodiment of FIG. 1, the arc in that embodiment tends to be unstable and to move about on the surface of the pool during the "keep-alive" portion of the discharge. In particular, the cathode spot is likely to wind around the rim of the pool near the tube 10 interface, eroding the insulator and causing tube darkening. FIG. 3 is an embodiment of a cathode end of an arc tube wherein a lower end cap 14a defines a reentrant opening which is attached to the arc tube 10. The arc spot on the pool is, thereby, separated from the arc tube wall to prevent erosion and darkening.

If the diameter of the arc tube 10 is selected to be sufficiently small, the liquid cesium reservoir is maintained at the cathode end of the discharge tube by capillary action, even if the lamp is operated in a non-vertical orientation. With such a small arc tube diameter, operation with the reservoir at the gravitational top of the tube is possible. However, this upside-down operation is not preferred since there is a tendency for the liquid cesium to run down the tube wall. If such operation is desirable though, the arc tube may be selectively narrowed at the cathode end to supply the desired capillary reservoir with cathode protruding therefrom. As noted above, there is an inherent tendency for the cesium to collect at the cathode electrode so that, with appropriate capillary dimensions, the cesium reservoir invariably resides at the cathode end of the tube after sustained operation irrespective of its initial location.

Figure 4:
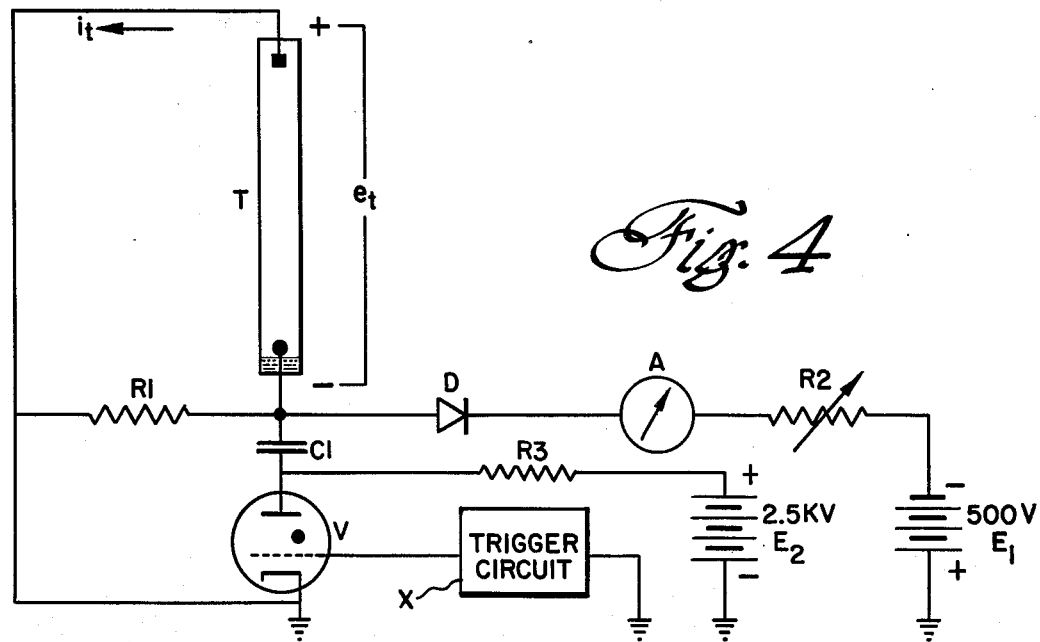
FIG. 4 is an operating circuit for lamps of the present invention.

FIG. 4 is a schematic diagram of a power supply which is suitable for operation with discharge lamps of the present invention. A discharge lamp T, which may be the lamp of FIG. 1, is connected in parallel with a load resistor R1 which may, for example, be a 25 kilohm resistor. A "keep-alive" current source comprising a voltage source E1 connected in series with a variable resistor R2 and an ammeter A is connected in series with the tube T. Typically, the voltage source E1 may supply 500 volts and the resistor R2 may be a 2000 ohm rheostat. A diode D is connected in series with the "keep-alive" current supply to prevent reverse pulse current flow. The variable resistor R2 is typically adjusted to provide a dc "keep-alive" current between approximately 0.5 ampere and approximately 1.5 amperes through the lamp T. The exact value of "keep-alive" current which is required for a particular mode of operation is determined as a function of the desired cesium vapor pressure in the tube. For example, the arc tube of FIG. 1 operating with 2 kilovolt, 60 pps pulses requires a 0.75 ampere "keep-alive" current to produce a 37 torr cesium vapor pressure.

A pulse current supply comprising a capacitor C1 and an ignitron tube V is connected across the lamp T in parallel with the "keep-alive" current supply. A second voltage source E2 in series with a resistor R3 provides charging current for the capacitor C1. An appropriate trigger circuit X is connected to the grid of the ignitron and operates, in a well-known manner, to initiate pulses in the arc tube. In a typical circuit, the capacitor C1 may, for example, comprise a 0.1 microfarad mica capacitor, the resistor R3 may be 5 kilohms and the voltage source E2 may be a 2.5 kilovolt power supply.

FIGS. 5A and 5B graphically indicate the voltage $e_t$ and the current $i_t$ which is produced on the arc tube by the circuit of FIG. 4. The infrared light output pulse from the arc tube, as measured by a silicon photodiode with a sensitivity peak near 950 nanometers, is indicated in FIG. 5C. The light output has a rise time of less than 1 microsecond and a somewhat longer decay time. The highest infrared light output from the lamp embodiment of FIG. 1 occurs at a cesium pressure of approximately 40 torr. At higher pressures the peak infrared light output gradually falls and the rise time of the light pulse lengthens. The infrared radiance of the arc has been measured to be approximately 215, $\pm 15$ watts/cm$^2$-steradian.

The regenerative cesium cathode cycle of arc tubes of the present invention permits operating lives far in excess of those experienced with prior art, solid cathode tubes. A light source of the present invention has operated under 60 pps conditions with 0.2 joule pulses of 250 kilowatts peak power under substantially continuous conditions for over 7000 hours with no signs of deterioration indicating a lifetime in excess of $2 \times 10^9$ pulses.

Infrared light sources of the present invention are ideally suited for driving light-activated thyristors in solid state power converters. FIG. 6 is a system for driving light-activated thyristors with an arc lamp of the present invention. An arc lamp 50, which may be the arc lamp of FIG. 1, is connected to a pulsed power supply circuit 52, which may be the power supply circuit of FIG. 4, to produce appropriately timed and sequenced light pulses. A series of optical elements which may, for example, be simple condensing lenses 54, focus light from the tube 50 onto the ends of a plurality of fiber optic light pipes 56. In some applications, depending on the attenuation characteristics of the light pipes 56 and the sensitivity of the elements driven therefrom, it may be possible to dispense with the optical elements 54 and to focus one end of each light pipe directly on the arc in the tube 50. The end of each of the light pipes 56a opposite from the arc tube 50 is focused on a triggering region of a light-activated thyristor 58 in the power converter circuit. Typically, the cathodes of those thyristors 58 which are triggered from a common arc tube are at widely varying voltages $E_A$, $E_B$, and $E_C$, and the fiber optic light pipes 56 provide necessary dielectric isolation. The arc tube embodiment of FIG. 1 can easily accommodate in excess of 10,000 separate fiber optic light pipes, a number well in excess of 2,000 light pipes which are typically required for solid state power converters in high voltage, dc transmission applications.

Infrared light sources of the present invention, which operate at a cesium vapor pressure of approximately 10 torr, are highly effective, as long-lived pump sources for driving neodymium lasers in the 0.74$\mu$ to 0.83$\mu$ band. FIG. 7 is a sectional view of four lamps 50 of the present invention, coupled to a neodymium-glass laser rod 60 within a circular reflector 62 and driven from pulse circuits 52. Arc lamps of the present invention may, in general, be coupled to laser rods using any of the configurations and techniques which are well known in the laser art and the embodiment of FIG. 7 is, therefore, merely illustrative of such an application. Arc tubes in lamps utilized for laser pump sources may, if desired, be constructed from translucent alumina.

Arc lamps of the present invention, which operate with a regenerative cesium cathode cycle, provide long-lived, pulsed light sources and are particularly suited for operation with light activated thyristors and as pump sources for neodymium-glass or neodymium-YAG lasers.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A long-lived metal vapor discharge lamp, suitable for operation in a pulsed mode, comprising:
   an evacuable arc tube having a first end and a second end;
   a solid metal anode disposed in the first end of said arc tube;
   a liquid cesium reservoir disposed in the second end of said arc tube;
   a cathode comprising a conductive material capable of adsorbing cesium, said cathode pointedly protruding from said reservoir so as to provide a preferred discharge path; and
   a fill gas, including cesium vapor, disposed within said arc tube between said anode and said cathode at a vapor pressure between approximately 5 torr and approximately 100 torr.

2. The lamp of claim 1 further including an evacuable envelope surrounding said arc tube and spaced apart therefrom.

3. The lamp of claim 2 wherein the space between said envelope and said arc tube is evacuated.

4. The lamp of claim 2 further comprising an inert gas disposed between said arc tube and said envelope.

5. The lamp of claim 2 wherein said envelope is glass.

6. The lamp of claim 1 wherein said arc tube, said cathode, and said anode comprise materials which are resistant to chemical attack by cesium vapor and liquid cesium.

7. The lamp of claim 6 wherein said arc tube comprises materials selected from the group consisting of transparent alumina and translucent alumina.

8. The lamp of claim 6 wherein said cathode and said anode comprise material selected from the group consisting of tunsten, platinum, iridium, and osmium.

9. The lamp of claim 1 wherein said fill gas further comprises xenon.

10. The lamp of claim 9 wherein the pressure of said xenon is approximately 10 torr at room temperature.

11. The lamp of claim 1 further including metal end caps disposed at the first end and the second end of said arc tube.

12. The lamp of claim 11 wherein said end caps comprise niobium.

13. The lamp of claim 1 wherein said cathode comprises material selected from the group consisting of tungsten, platinum, iridium, and osmium.

14. The lamp of claim 1 in which the diameter of said arc tube is such that said reservoir is maintained in said second end thereof by capillary action.

15. The lamp of claim 1 further including a supply of pulsed electric current connected in series with said cathode and said anode.

16. The lamp of claim 15 further including means to produce a direct electrical current between said cathode and said anode.

17. The lamp of claim 16 wherein said direct electrical current is between 0.5 ampere and 1.5 amperes.

18. The lamp of claim 15 further including means for maintaining the pressure of said cesium vapor at a value between approximately 1 torr and approximately 300 torr at such time as electrical current is flowing between said cathode and said anode.

19. The lamp of claim 18 wherein said means for maintaining the pressure of said cesium vapor includes means for imposing and adjusting a direct electrical current between said anode and said cathode.

20. The lamp of claim 18 wherein said means for maintaining the pressure of said cesium vapor includes heating means disposed adjacent said arc tube.

21. The lamp of claim 18 wherein said means for maintaining the pressure of said cesium vapor includes heat shields disposed outside of said arc tube.

22. The lamp of claim 1 further including means for maintaining the temperature of walls of said arc tube, in regions above said cathode, at a temperature above the temperature of said cesium pool.

23. The lamp of claim 1 wherein the pressure of said cesium vapor is approximately 40 torr.

24. The lamp of claim 1 further including a plurality of dielectric light pipes disposed to receive and conduct radiation emanating from a region between said cathode and said anode.

25. A long-lived metal vapor discharge lamp, suitable for operation in a pulsed mode, comprising:
an evacuable arc tube having a first end and a second end;
a solid metal anode disposed in the first end of said arc tube;
a reentrant metal end cap sealably closing the second end of said tube;
a liquid cesium reservoir disposed in said reentrant end cap; and
a fill gas, including cesium vapor, disposed within said arc tube between said anode and said cathode at a vapor pressure between approximately 5 torr and approximately 100 torr.

* * * * *